E. A. LE BEAU.
BRAKE BEAM.
APPLICATION FILED JULY 24, 1911.
1,024,484. Patented Apr. 23, 1912.
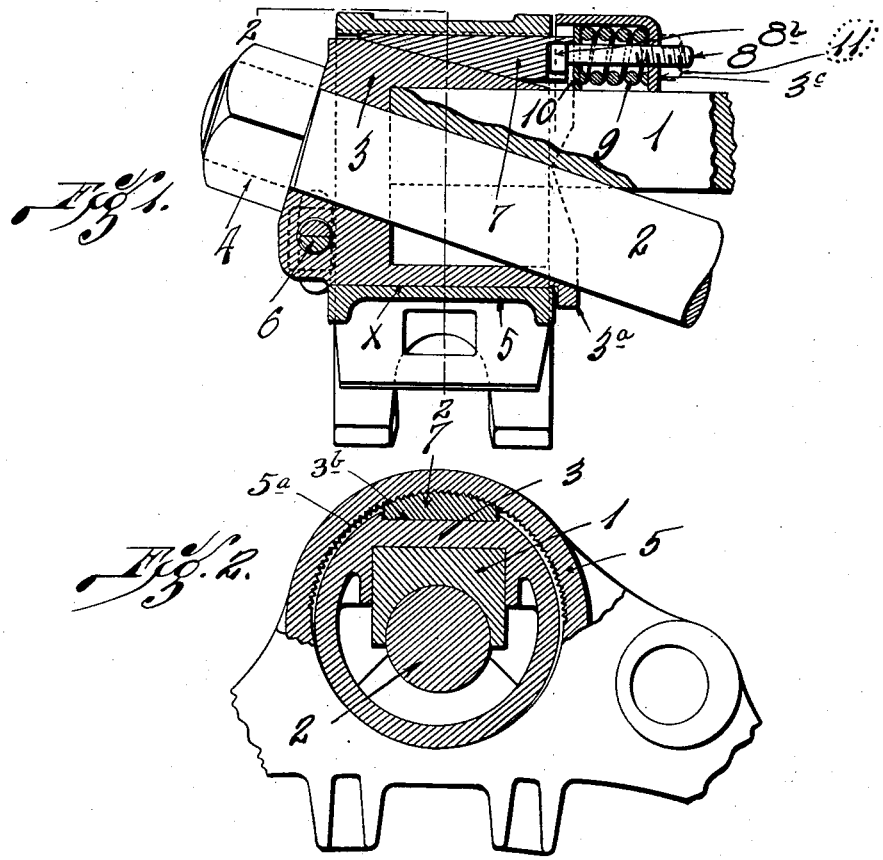
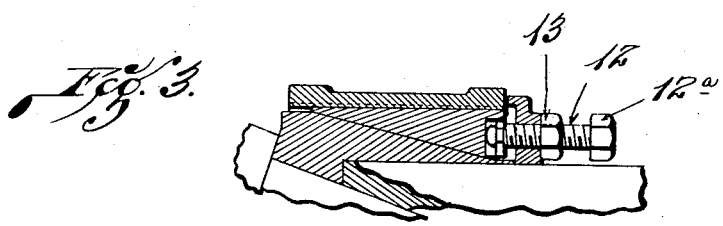
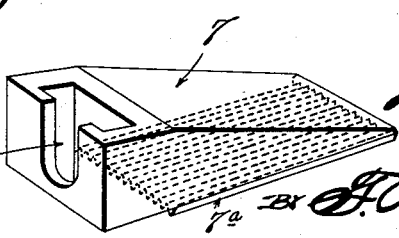
ATTEST.
F. M. Kenington.
Wm. Jarius.
INVENTOR.
E. A. LE BEAU.
BY J. W. Cornwall, Atty.

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,024,484.　　　　Specification of Letters Patent.　　Patented Apr. 23, 1912.

Application filed July 24, 1911. Serial No. 640,091.

*To all whom it may concern:*

Be it known that I, ERNEST A. LE BEAU, a citizen of the United States, residing at Chicago, county of Cook, and State of Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a longitudinal sectional view through one end of the brake beam showing my improved head locking device. Fig. 2 is a sectional view on line 2—2, Fig. 1. Fig. 3 is a longitudinal sectional view of a modified form of locking. Fig. 4 is a detailed view of a locking block.

This invention relates to a new and useful improvement in brake beams, the object being to provide the head with a locking block by which wear between the front face of the sleeve and the head may be taken up to prevent the rattling of the parts and also provide means whereby the head will be locked or clamped in proper position.

In the drawings: 1 indicates the compression member of the brake beam and 2 is the tension member.

3 is the sleeve into which the end of the compression member finds a seat and through which the end of the tension member passes, the nut 4 on the tension member impinging against the end of said sleeve, as shown.

5 is the brake head which is rotatably mounted on the sleeve and abuts against a flange 3ª thereof, said brake head being held against longitudinal displacement by means of a cotter pin 6. The rear face of the socket wall of the brake head is preferably provided with serrations 5ª, (see Fig. 2). The sleeve 3 is, preferably at its rear side, provided with an inclined key-way 3ᵇ, in which is arranged a longitudinally movable locking block 7. This locking block is preferably of wedge shape and at its outer face is provided with serrations 7ª (see Fig. 4) which coöperate with the serrations on the brake head. The inner end of the locking block 7 is provided with an inwardly opening T-shaped groove 7ᵇ which is adapted to receive the head 8ᵇ of a retrieving bolt 8. This bolt passes through a housing 3ᶜ preferably integral with the sleeve 3 and in which housing is arranged a spring 9 bearing against the outer end of the housing and against a spring follower or washer 10 abutting against the end of the wedge-shaped locking block 7.

In operation, the spring 9 tends at all times to force the wedge-shaped locking block 7 outwardly and by so doing takes up any wear between the sleeve 3 and the front wall of the brake head at the point indicated at X thus eliminating lost motion, and by so doing avoiding excess movement of the piston in the brake cylinder in applying the brakes. To retrieve the locking block 7, the nut 11 may be placed on the end of the retrieving bolt 8 and upon being turned down, said nut will place the spring under compression and permit the brake head to be turned freely on the sleeve. When, however, the spring 9 is in operative position, it will force the wedge-shaped locking block between the sleeve and the head locking the head in adjusted position and at the same time taking up all wear at the point X, and in this way prevent rattling of the parts.

In Fig. 3, I have shown a modified form of my invention in which no spring is employed to automatically take up wear and lock the head in position, but in lieu thereof a pressure bolt 12 is used which pressure bolt has a head 12ª and coöperates with a jam nut 13. By the use of this pressure bolt the wedge-shaped locking block may be positively moved into locking position.

What I claim is:

1. In a brake beam, the combination of a part of the brake beam on which the head is mounted, said part having a key-way extending in a direction longitudinally to the beam, a brake head mounted on said part, and a wedge-shaped locking block or key arranged in said key-way and engaging said head.

2. In a brake beam, the combination of a part of the brake beam on which the head is mounted, said part having an inclined key-way, a brake head mounted on said part, and a wedge-shaped locking block or key arranged in said key-way and engaging said head; said locking block being located at the rear side of the brake beam so as to take up wear between the front face of said part, in which it is mounted, and the brake head.

3. In a brake beam, the combination of a part of the brake beam on which the head is mounted, said part having an inclined key-way and locking block arranged in said key-way, a head mounted on said part coöperating with said locking block, and means for exerting pressure against said locking block so as to wedge the same between the head and the part on which the head is mounted.

4. In a brake beam, the combination of a part of the brake beam on which the head is mounted, said part having an inclined key-way and locking block arranged in said key-way, a head mounted on said part coöperating with said locking block, and means for exerting yielding pressure against said locking block so as to wedge the same between the head and the part on which the head is mounted.

5. In a brake beam, the combination of a part of the brake beam on which the brake head is mounted, a brake head mounted on said part, said head having serrations on the inner face of its socket and a longitudinally movable wedge-shaped locking block having serrations on its outer face to engage the serrations on the head.

6. In a brake beam, the combination of a part of the brake beam on which the brake head is mounted, a brake head mounted on said part, said head having serrations on the inner face of its socket and a longitudinally movable wedge-shaped locking block having serrations on its outer face to engage the serrations on the head, and means for moving said locking block into wedging action between the head and the part on which the head is mounted.

7. In a brake beam, the combination of a part of the brake beam on which the brake head is mounted, a brake head mounted on said part, said head having serrations on the inner face of its socket and a longitudinally movable wedge-shaped locking block having serrations on its outer face to engage the serrations on the head, and yielding means for moving said locking block into wedging action between the head and the part on which the head is mounted.

8. In a brake beam, the combination of a sleeve having an inclined key-way, a brake head mounted on said sleeve, a locking block arranged in said key-way, and means for wedging said locking block in said sleeve and brake head.

9. In a brake beam, the combination of a sleeve having an inclined key-way, a brake head mounted on said sleeve, a locking block arranged in said key-way, and means for wedging said locking block in said sleeve and brake head; said means coöperating with said sleeve.

10. In a brake beam, the combination of a sleeve having an inclined key-way, a brake head mounted on said sleeve, a locking block arranged in said key-way, and yielding means for wedging said locking block on said sleeve and brake head.

11. In a brake beam, the combination of a sleeve having an inclined key-way, a brake head mounted on said sleeve, a locking block arranged in said keyway, and yielding means for wedging said locking block on said sleeve and brake head; said yielding means coöperating with said sleeve.

12. In a brake beam, the combination of a sleeve having an inclined key-way, a brake head, a wedge-shaped locking block, a projection extending from said sleeve, and a retrieving bolt mounted in said projection and coöperating with said locking block.

13. In a brake beam, the combination of a sleeve having an inclined keyway, a brake head, a wedge-shaped locking block, a projection extending from said sleeve, a retrieving bolt mounted in said projection and coöperating with said locking block, and a spring surrounding said retrieving bolt.

14. In a brake beam, the combination of a sleeve having an inclined key-way, a brake head, a wedge-shaped locking block arranged in said key-way, said locking block having an inwardly opening T-shaped groove in its end, and a retrieving bolt having a head fitted in said T-shaped groove; said retrieving bolt being mounted in a part of the sleeve.

In testimony whereof I hereunto affix my signature in the presence of two witnesses, this 14th day of July, 1911.

ERNEST A. LE BEAU.

Witnesses:
E. T. WALKER,
M. F. HUNTOON.

Copies of this patent may be obtained for five cents each, by addressing the "Commissioner of Patents, Washington, D. C."